United States Patent
Wu

(10) Patent No.: US 10,508,533 B2
(45) Date of Patent: Dec. 17, 2019

(54) WELL RANGING APPARATUS, SYSTEMS, AND METHODS

(71) Applicant: Halliburton Energy Services, Inc., Houston, TX (US)

(72) Inventor: Hsu-Hsiang Wu, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 505 days.

(21) Appl. No.: 14/769,512

(22) PCT Filed: Aug. 4, 2015

(86) PCT No.: PCT/US2015/043587
§ 371 (c)(1),
(2) Date: Aug. 21, 2015

(87) PCT Pub. No.: WO2016/025238
PCT Pub. Date: Feb. 18, 2016

(65) Prior Publication Data
US 2016/0273339 A1 Sep. 22, 2016

Related U.S. Application Data

(60) Provisional application No. 62/035,877, filed on Aug. 11, 2014, provisional application No. 62/037,440, (Continued)

(51) Int. Cl.
*E21B 47/022* (2012.01)
*G01V 3/26* (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC ....................................................... G01V 3/30
(Continued)

(56) References Cited

U.S. PATENT DOCUMENTS 4,372,398 A 2/1983 Kuckes
4,443,762 A 4/1984 Kuckes
(Continued)

FOREIGN PATENT DOCUMENTS

WO WO-2007/015087 A1 2/2007
WO WO-2012/134468 A1 10/2012
(Continued)

OTHER PUBLICATIONS

Definition of wellhead accessed through Schlumberger Oilfield Glossary on Nov. 15, 2016 via http://www.glossary.oilfield.slb.com/Terms/w/wellhead.aspx, 1 pages.
(Continued)

*Primary Examiner* — Douglas X Rodriguez
(74) *Attorney, Agent, or Firm* — Gilliam IP PLLC

(57) ABSTRACT

Disclosed embodiments include apparatus, systems, and methods which operate to include monitoring an electromagnetic signal and/or gamma ray spectra count values to determine interception of a first well created by a drill string, with a well casing surrounding a second well. Interception can be determined when a reception antenna is used to receive the electromagnetic signal, by examining values associated with the magnitude of the signal. Interception can also be determined when a ratio of the gamma ray spectra count values have exceeded a first predetermined threshold, or when capture gamma energy indicated by the gamma ray spectra count values exceeds a second predetermined threshold. Additional apparatus, systems, and methods are disclosed.

15 Claims, 12 Drawing Sheets

Related U.S. Application Data filed on Aug. 14, 2014, provisional application No. 62/078,732, filed on Nov. 12, 2014.

(51) Int. Cl.

| | | |
|---|---|---|
| *E21B 7/04* | (2006.01) | |
| *E21B 33/14* | (2006.01) | |
| *E21B 47/024* | (2006.01) | |
| *G01V 99/00* | (2009.01) | |
| *G06F 17/11* | (2006.01) | |
| *E21B 43/24* | (2006.01) | |
| *E21B 47/12* | (2012.01) | |
| *E21B 47/18* | (2012.01) | |

(52) U.S. Cl.
CPC .............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
USPC ........................................................ 324/338
See application file for complete search history.

(56) References Cited

U.S. PATENT DOCUMENTS

| | | | |
|---|---|---|---|
| 4,700,142 A | 10/1987 | Kuckes | |
| 4,763,520 A | 8/1988 | Titchener et al. | |
| 4,933,640 A | 6/1990 | Kuckes | |
| 5,065,100 A | 11/1991 | Vail, III | |
| 5,084,678 A | 1/1992 | Hutin | |
| 5,189,415 A | 2/1993 | Shimada et al. | |
| 5,230,387 A | 7/1993 | Waters et al. | |
| 5,258,755 A | 11/1993 | Kuckes | |
| 5,305,212 A | 4/1994 | Kuckes | |
| 5,485,089 A | 1/1996 | Kuckes | |
| 5,512,830 A | 4/1996 | Kuckes | |
| 5,582,248 A | 12/1996 | Estes | |
| 5,589,775 A | 12/1996 | Kuckes | |
| 5,923,170 A | 7/1999 | Kuckes | |
| 6,179,066 B1 | 1/2001 | Nasr et al. | |
| 6,525,540 B1 | 2/2003 | Kong et al. | |
| 6,985,814 B2 | 1/2006 | Mcelhinney | |
| 7,268,552 B1 | 9/2007 | Gerald, II et al. | |
| 7,703,548 B2 | 4/2010 | Clark | |
| 7,719,282 B2 | 5/2010 | Fanini et al. | |
| 7,866,386 B2 | 1/2011 | Beer et al. | |
| 7,962,287 B2 | 6/2011 | Clark | |
| 7,969,819 B2 | 6/2011 | Hall et al. | |
| 8,011,451 B2 | 9/2011 | MacDonald | |
| 8,126,650 B2 | 2/2012 | Lu et al. | |
| 8,237,443 B2 | 8/2012 | Hopmann et al. | |
| 8,324,912 B2 | 12/2012 | Waid et al. | |
| 8,462,012 B2 | 6/2013 | Clark et al. | |
| 8,680,866 B2 | 3/2014 | Marsala et al. | |
| 8,749,243 B2 | 6/2014 | Bittar et al. | |
| 8,844,648 B2 | 9/2014 | Bittar et al. | |
| 9,404,354 B2 | 8/2016 | Sugiura | |
| 9,581,718 B2 * | 2/2017 | Rodney .......................... 324/338 | |
| 9,702,240 B2 * | 7/2017 | Bittar et al. ..................... 175/45 | |
| 2002/0000808 A1 | 1/2002 | Nichols | |
| 2003/0137297 A1 | 7/2003 | Ganesan | |
| 2004/0163443 A1 | 8/2004 | McElhinney | |
| 2005/0218898 A1 | 10/2005 | Fredette et al. | |
| 2006/0113112 A1 | 6/2006 | Waters | |
| 2006/0131013 A1 | 6/2006 | McElhinney | |
| 2007/0126426 A1 | 6/2007 | Clark et al. | |
| 2007/0187089 A1 | 8/2007 | Bridges | |
| 2008/0000686 A1 | 1/2008 | Kuckes et al. | |
| 2008/0177475 A1 | 7/2008 | McElhinney et al. | |
| 2008/0275648 A1 | 11/2008 | Illfelder | |
| 2009/0164127 A1 | 6/2009 | Clark | |
| 2009/0178850 A1 | 7/2009 | Waters et al. | |
| 2009/0260878 A1 | 10/2009 | Morley et al. | |
| 2009/0308657 A1 | 12/2009 | Clark et al. | |
| 2010/0194395 A1 | 8/2010 | Mcelhinney | |
| 2010/0300756 A1 | 12/2010 | Bergstrom et al. | |
| 2010/0332137 A1 | 12/2010 | Meadows et al. | |
| 2011/0015862 A1 | 1/2011 | Sato et al. | |
| 2011/0018542 A1 | 1/2011 | Clark et al. | |
| 2011/0088890 A1 | 4/2011 | Clark | |
| 2011/0284731 A1 | 11/2011 | Roscoe et al. | |
| 2011/0290011 A1 | 12/2011 | Dowla et al. | |
| 2011/0308794 A1 | 12/2011 | Bittar et al. | |
| 2011/0308859 A1 | 12/2011 | Bittar et al. | |
| 2011/0309836 A1 | 12/2011 | Bittar et al. | |
| 2012/0001637 A1 | 1/2012 | Bittar et al. | |
| 2012/0013339 A1 | 1/2012 | Kuckes et al. | |
| 2012/0109527 A1 | 5/2012 | Bespalov et al. | |
| 2012/0139543 A1 | 6/2012 | McElhinney et al. | |
| 2012/0158305 A1 | 6/2012 | Rodney et al. | |
| 2012/0257475 A1 | 10/2012 | Luscombe et al. | |
| 2012/0273192 A1 | 11/2012 | Schmidt et al. | |
| 2012/0283951 A1 | 11/2012 | Li et al. | |
| 2012/0283952 A1 | 11/2012 | Tang et al. | |
| 2013/0056272 A1 | 3/2013 | Kuckes | |
| 2013/0068526 A1 | 3/2013 | Snyder et al. | |
| 2013/0069655 A1 | 3/2013 | McElhinney et al. | |
| 2013/0151158 A1 | 6/2013 | Brooks et al. | |
| 2013/0173164 A1 | 7/2013 | Zhang | |
| 2013/0184995 A1 | 7/2013 | Sinclair et al. | |
| 2013/0333946 A1 | 12/2013 | Sugiura | |
| 2014/0132272 A1 | 5/2014 | Cuevas et al. | |
| 2014/0145857 A1 | 5/2014 | Comparetto | |
| 2014/0191120 A1 | 7/2014 | Donderici et al. | |
| 2014/0374159 A1* | 12/2014 | McElhinney ............. E21B 7/04 175/45 | |
| 2015/0013968 A1 | 1/2015 | Hsu et al. | |
| 2015/0124562 A1 | 5/2015 | Yoneshima et al. | |
| 2015/0240623 A1 | 8/2015 | Blangé et al. | |
| 2015/0361789 A1 | 12/2015 | Donderici et al. | |
| 2015/0378044 A1 | 12/2015 | Brooks | |
| 2016/0216396 A1 | 7/2016 | Golla et al. | |
| 2016/0258275 A1 | 9/2016 | Wu et al. | |
| 2016/0273338 A1 | 9/2016 | Wu | |
| 2016/0273340 A1 | 9/2016 | Roberson et al. | |
| 2016/0273341 A1 | 9/2016 | Wu et al. | |
| 2016/0273342 A1 | 9/2016 | Wu et al. | |
| 2016/0273343 A1 | 9/2016 | Donderici et al. | |
| 2016/0273344 A1 | 9/2016 | Wu et al. | |

FOREIGN PATENT DOCUMENTS

| | | | |
|---|---|---|---|
| WO | WO-2013/162505 A1 | 10/2013 | |
| WO | WO-2014/089402 A2 | 6/2014 | |
| WO | 2016025230 A1 | 2/2016 | |
| WO | 2016025232 A1 | 2/2016 | |
| WO | 2016025235 A1 | 2/2016 | |
| WO | 2016025237 A1 | 2/2016 | |
| WO | 2016025238 A1 | 2/2016 | |
| WO | 2016025241 A1 | 2/2016 | |
| WO | 2016025245 A1 | 2/2016 | |
| WO | 2016025247 A1 | 2/2016 | |

OTHER PUBLICATIONS

Definition of cement accessed through Schlumberger Oilfield Glossary on Nov. 15, 2016 via http://www.glossary.oilfield.slb.com/Terms/c/cement.aspx, 3 pages.
"International Application Serial No. PCT/US2015/043557, International Search Report dated Oct. 19, 2015", 3 pgs.
"International Application Serial No. PCT/US2015/043557, Written Opiniondated Oct. 19, 2015", 5 pgs.
"International Application Serial No. PCT/US2015/043566, International Search Report dated Oct. 26, 2015", 3 pgs.
"International Application Serial No. PCT/US2015/043566, Written Opinion dated Oct. 26, 2015", 11 pgs.
"International Application Serial No. PCT/US2015/043577, International Search Report dated Oct. 21, 2015", 3 pgs.

(56) References Cited

OTHER PUBLICATIONS

"International Application Serial No. PCT/US2015/043577, Written Opinion dated Oct. 21, 2015", 9 pgs.
"International Application Serial No. PCT/US2015/043580, International Search Report dated Nov. 11, 2015", 3 pgs.
"International Application Serial No. PCT/US2015/043580, Written Opinion dated Nov. 11, 2015", 9 pgs.
"International Application Serial No. PCT/US2015/043587, International Search Report Oct. 25, 2015", 3 pgs.
"International Application Serial No. PCT/US2015/043587, Written Opinion dated Oct. 26, 2015", 11 pgs.
"International Application Serial No. PCT/US2015/043604, International Search Report dated Oct. 28, 2015", 3 pgs.
"International Application Serial No. PCT/US2015/043604, Written Opinion dated Oct. 28, 2015", 14 pgs.
"International Application Serial No. PCT/US2015/043621, International Search Report dated Oct. 19, 2015", 3 pgs.
"International Application Serial No. PCT/US2015/043621, Written Opinion dated Oct. 19, 2015", 5 pgs.
"International Application Serial No. PCT/US2015/043639, International Search Report dated Oct. 27, 2015", 3 pgs.
"International Application Serial No. PCT/US2015/043639, Written Opinion dated Oct. 27, 2015", 10 pgs.
Van Dongen, "A Directional Borehole Radar System for Subsurface Imaging", DUP Science, Jan. 1, 2002, 111 pgs.
"International Application Serial No. PCT/US2015/043587, International Search Report dated Oct. 26, 2015", 3 pgs.
CA Application Serial No. 2,954,301, Office Action 3, dated Mar. 1, 2019, 5 pages.
CA Application Serial No. 2954674, First Examiner's Letter, dated Dec. 12, 2017, 3 pages.
CA Application Serial No. 2954723, First Exam Report, dated Dec. 5, 2017, 3 Pages.
CA Application Serial No. 2954726, First Examiner's Letter, dated Dec. 12, 2017, 3 pages.
GCC Application Serial No. 2015/29856, Second Examination Report, dated Jun. 24, 2018, 3 pages.
GCC Application Serial No. 2015/29857, Second Examination Report, dated Jun. 24, 2018, 3 pages.
GCC Application Serial No. 2015/29873, Second Examination Report, dated Jun. 24, 2018, 3 pages.
Canadian Application Serial No. 2,954,657, Second Examiner's Letter, dated Jun. 5, 2018, 4 pages.
Canadian Application Serial No. 2,954,668, Second Examiner's Report, dated Jun. 6, 2018, 4 pages.
GCC Application Serial No. 2015/29857, First Examination Report, dated Jan. 23, 2018, 4 pages.
GCC Application Serial No. 2015/29856, First Examination Report, dated Jan. 23, 2018, 4 pages.
GCC Application Serial No. 2015/29871, 2nd Examination Letter, dated Aug. 30, 2018, 4 pages.
GCC Application Serial No. 2015/29874, Second Examination Report, dated Jun. 24, 2018, 4 pages.
CA Application Serial No. 2954303, First Exam Report, dated Nov. 29, 2017, 5 pages.
Canadian Application Serial No. 2,954,303, Second Examiner's Letter, dated Jul. 24, 2018, 5 pages.
GCC Application Serial No. 2015/29871, First Examination Report, dated Feb. 28, 2018, 5 pages.
CA Application Serial No. 2954301, First Exam Report, dated Nov. 29, 2017, 6 pages.
Canadian Application No. 2,954,666, Second Examiner's Report, dated Jul. 30, 2018, 6 pages.
Canadian Application Serial No. 2,954,301, Second Examiner's Letter, dated Jun. 1, 2018, 6 pages.
GCC Application Serial No. 2015/29874, First Examination Report, dated Jan. 23, 2018, 6 pages.
GCC Application Serial No. 2015/29873, First Examination Report, dated Feb. 8, 2018, 8 pages.
GCC Application Serial No. 2015/29872; Examination Report; dated Nov. 22, 2018, 4 pages.
CA Application Serial No. 2,954,666; Examiner's Letter; dated Apr. 17, 2019, 5 pages.
CA Application Serial No. 2,954,303, Office Action, dated Apr. 24, 2019, 5 pages.
CA Application Serial No. 2,954,657; Examiner's Letter; dated Dec. 5, 2017, 3 pages.
CA Application Serial No. 2,954,668, Office Action, dated Mar. 5, 2019, 5 pages.
CA Application Serial No. 2,954,668; Examiner's Letter; dated Dec. 12, 2017, 5 pages.
GCC Application Serial No. 2015/29861, GCC Examination Report; dated Jan. 23, 2018, 5 pages.
GCC Application Serial No. 2015/29864, GCC Examination Report; dated Nov. 22, 2018, 5 pages.
U.S. Appl. No. 14/769,533, Non-Final Office Action, dated Apr. 26, 2019, 33 pages.
U.S. Appl. No. 14/769,539, Final Office Action, dated Dec. 7, 2017, 19 pages.
U.S. Appl. No. 14/769,548, Final Office Action, dated Jun. 27, 2019, 30 pages.
U.S. Appl. No. 14/769,548, Non-Final Office Action dated Mar. 11, 2019, 30 pages.
U.S. Appl. No. 15/666,137, Non-Final Office Action, dated Jun. 24, 2019, 6 pages.
U.S. Appl. No. 15/666,137, Non-Final Office Action, dated Dec. 5, 2018, 7 pages.

\* cited by examiner

WELL RANGING APPARATUS, SYSTEMS, AND METHODS

CROSS-REFERENCE TO RELATED APPLICATIONS

The present application is a U.S. National Stage Filing under 35 U.S.C. 371 from International Application No. PCT/US2015/043587, filed on 4 Aug. 2015, which application claims the benefit of priority to provisional application Ser. No. 62/035,877, filed Aug. 11, 2014; provisional application Ser. No. 62/037,440, filed Aug. 14, 2014; and provisional application Ser. No. 62/078,732, filed Nov. 12, 2014; each of which is incorporated herein by reference in its entirely.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
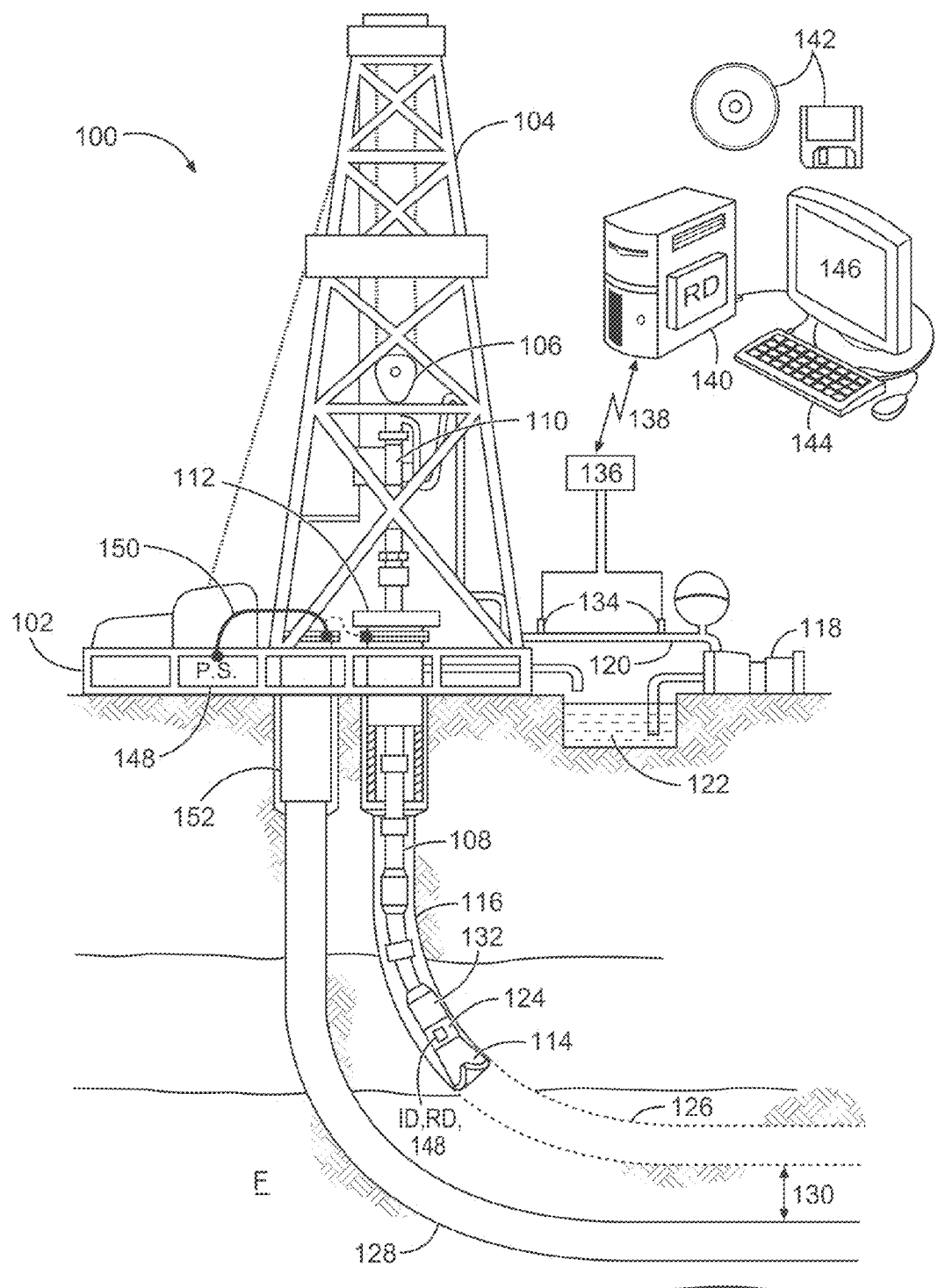
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly (BHA) that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The BHA further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the BHA. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined. The power supply 148 can also be connected to inject current into the casing of the drilling well 126, or be disposed downhole in either the drilling well 126 (shown in this figure) or the target well 128 (not shown in this figure).

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

On occasion, there is a desire from customers to prove successful intersection as a part of well ranging applications. However, when an attempt is made to drill one well to intercept another (e.g., to intercept a target well), there may be no easy way to demonstrate that interception has in fact occurred, especially at greater depths. As a solution to this technical problem, the inventors have developed a variety of apparatus, systems, and methods to determine when a well intersection service has been completed. These mechanisms, including the use of electromagnetic and density tools, can be useful to reliably demonstrate successful intersection. The result of implementing various embodiments may be improved accuracy when determining the range between wells.

Detailed Presentation

In some embodiments, an electromagnetic resistivity tool can be used to identify whether the drill bit has successfully intercepted the target well. For example, a single electromagnetic transmitter at the bit, and a resistivity receiver antenna in the BHA, mechanically coupled to the bit, can be used to demonstrate that a drilling well has intercepted a target well. In this case, the receiver is operable to receive a signal representing resistivity of the surrounding environment, as originated by the transmitter. Thus, when penetration of the target well casing occurs, the received signal characteristics will change abruptly (when comparing the signal that was present as the drill passed through the surrounding formation, to the signal arising when the drill penetrates the target well casing). At the time interception occurs, the data from the receiver will be relatively strong—having a greater magnitude than was present prior to interception.

Other logging tools, such as a density tool, may also provide abnormal signal readings when their sensors are located inside the casing. For example, the imaging responses of a density tool are able to present high density data when sensors are inside the casing. Several embodiments that make use of these concepts will now be described.

Electromagnetic Logging Tools Used to Determine Well Interception

Electromagnetic resistivity logging tools are widely available. These tools operate by transmitting an electromagnetic signal from a transmitter antenna into the surrounding formation, and taking measurements at a receiver antenna to determine formation properties surrounding the logging tool.

Figure 2:
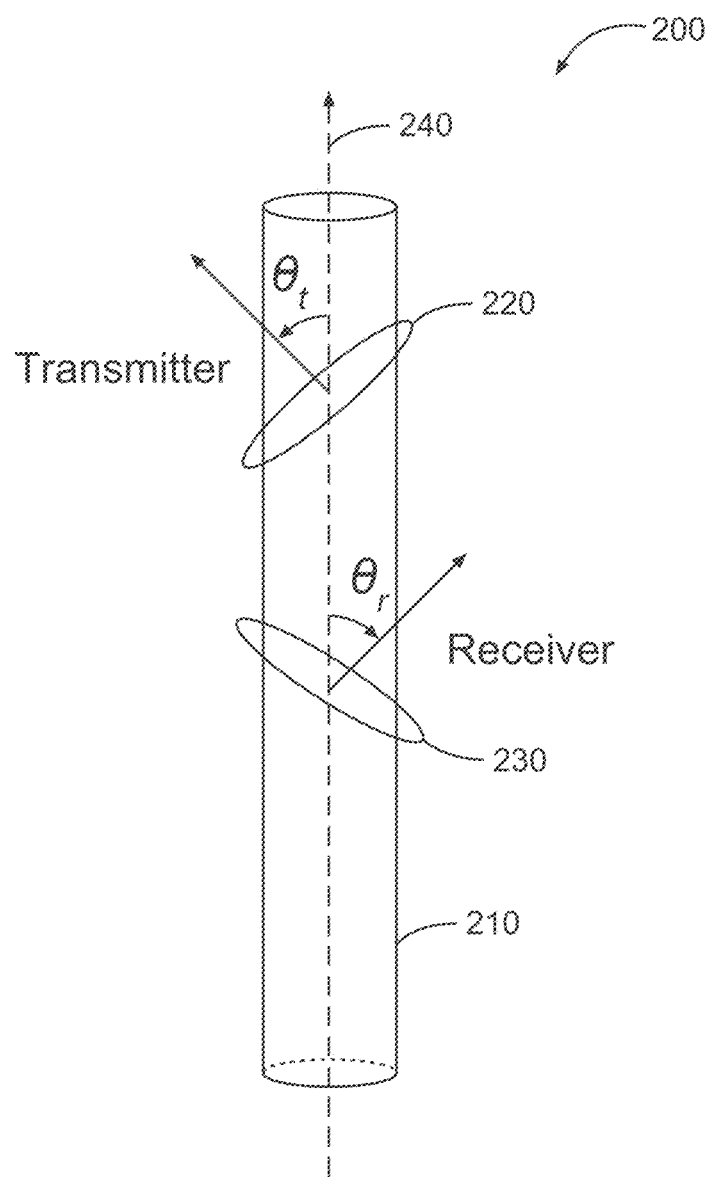
FIG. 2 illustrates an apparatus comprising an electromagnetic tool, according to various embodiments.

FIG. 2 illustrates an apparatus 200 comprising an electromagnetic tool, according to various embodiments. Here the apparatus 200 comprises an electromagnetic tool 210 attached to transmitter and receiver antennas 220, 230. As shown in the figure, the transmitter antenna 220 or receiver antenna 230, or both, can be "tilted" with respect to the tool longitudinal axis 240, providing azimuthal sensitivity in tool measurements. That is, the tool longitudinal axis 240 does not lie in the plane of an antenna when the antenna is tilted with respect to the tool longitudinal axis 240. However, when a pair of antennas (e.g., transmitter and receiver) are designated as "tilted" herein, this can be defined as a condition where both antennas are tilted with respect to each other. This means that the relative angle between the planes of the receiver and transmitter antennas is greater than zero degrees (i.e., they are oriented in a non-parallel manner with respect to each other).

Thus, for example, in some embodiments, both the transmitter and receiver antennas 220, 230 are tilted with respect to the tool longitudinal axis 240, but the antennas 220, 230 are actually parallel to each other. In other embodiments, one or none of the antennas (e.g., antenna 220) is tilted with respect to the other antenna (e.g., antenna 230), or with respect to the too longitudinal axis 240. Therefore, the reader should use the context of the description herein, or the language of the claims, to determine when a particular antenna is tilted with respect to another antenna, or with respect to a tool longitudinal axis.

Owing to the characteristics of electromagnetic signals, resistivity logging tool responses are relatively sensitive to conductive materials that may be located nearby. This is because the electromagnetic signals originating at the transmitter antenna 220 induce significant signals in surrounding conductive materials, causing significant receiver measurements at the tool.

Figure 3:
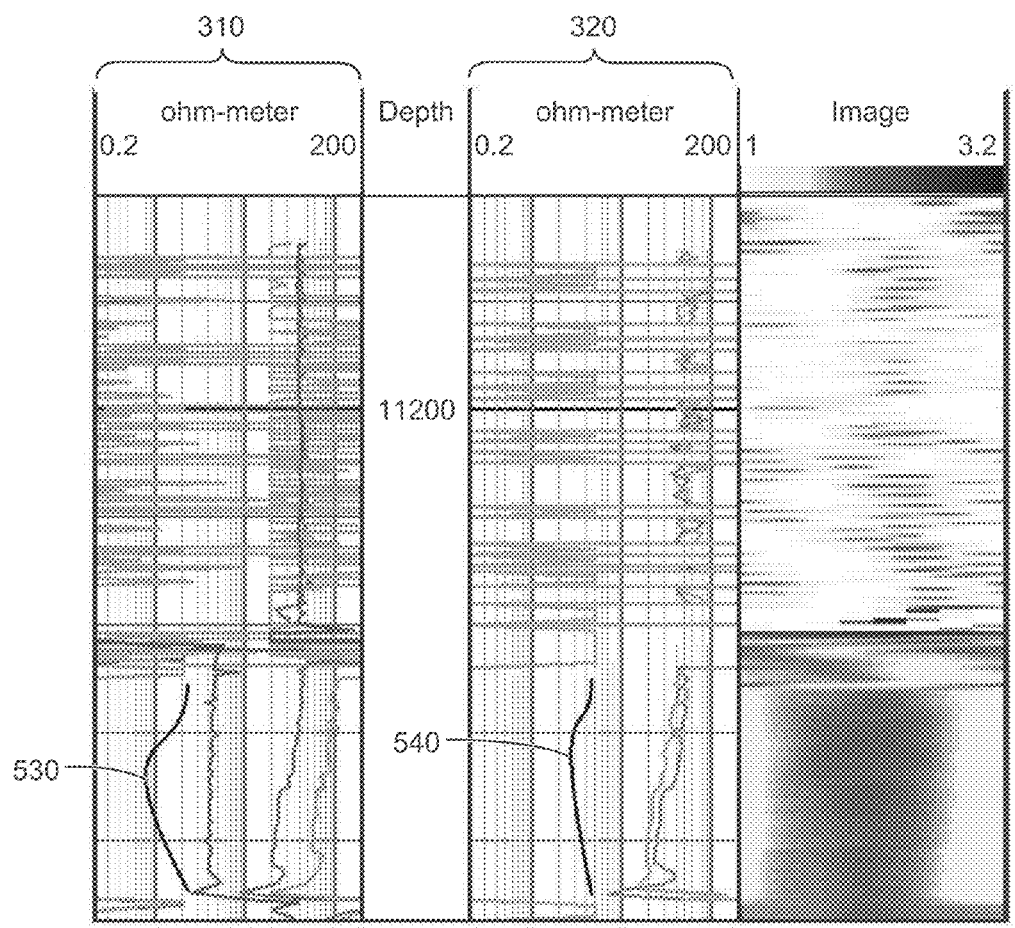
FIG. 3 illustrates a pair of resistivity logs, according to various embodiments.

FIG. 3 illustrates a pair of resistivity logs 310, 320, according to various embodiments. The logs 310, 320 are examples of recorded resistivity from a tool that was located inside a well casing at a depth of about 11,200 m, showing abnormal resistivity measurements in areas 530, 540 in the log (i.e., at track 1 and track 3 from the left) upon penetrating a target well casing. That is, the tool was located inside the casing at the top of the logs 310, 320, and outside the casing at the bottom of the logs 310, 320. Penetration is indicated by the irregular data near the bottom of the logs 310, 320, in areas 530 and 540.

After penetration, the tool emerged from the well casing to provide resistivity readings that were again in the normal range. Thus, detecting abnormal resistivity responses as a part of logging tool activity can help identify when interception of a cased well has occurred.

In some embodiments, the amplitude data is binned as the tool rotates. The data values in the bins should be relatively constant when interception occurs. That is, the binned values should be within a selected range, such as 10%, or 20%, or 25%, or 30%, or 40%, or 50% of an average value of all magnitudes of the binned signals, distributed among the bins.

In some embodiments, the receiver and transmitter locations can be exchanged, and the transmitter and/or receiver antenna can be tilted, as shown in FIG. 2. In some embodiments, a "transmitter" comprises a transmission antenna (e.g., transmitter antenna 220), as shown in FIG. 2, or a current source (e.g., the power supply 148 in FIG. 1) to couple to a well casing or a down hole tool (e.g., when the current source is connected to the well casing, or included in the down hole tool, respectively, as shown in FIG. 1). In either case, the transmitter serves to provide an electromagnetic signal to the reception antenna.

Figure 4:
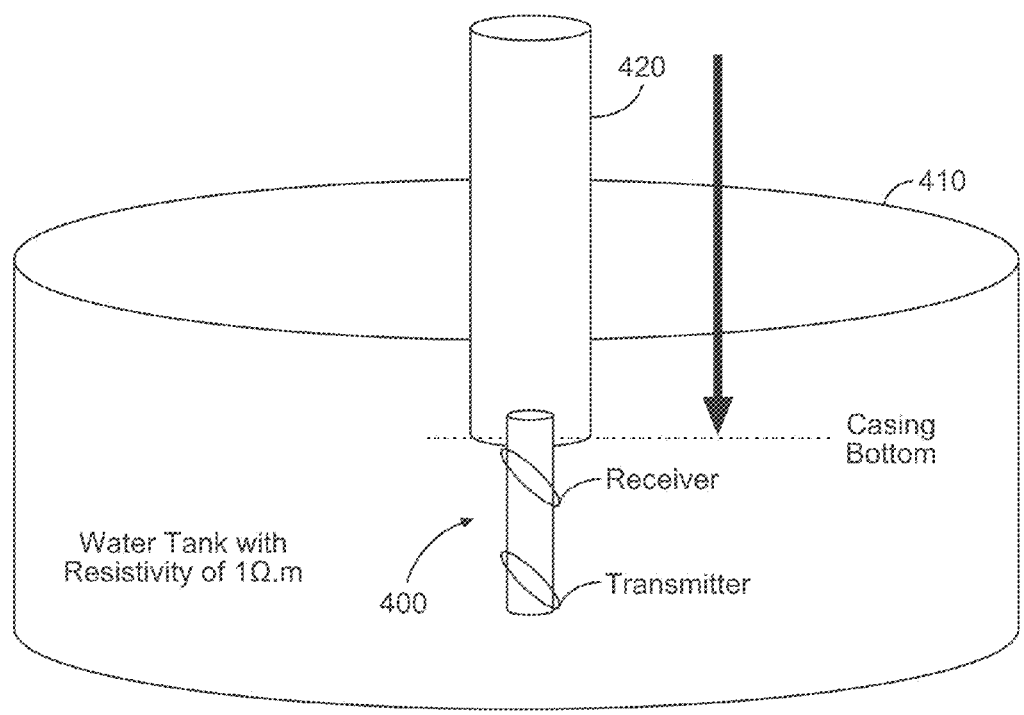
FIG. 4 illustrates testing an electromagnetic tool, according to various embodiments.

FIG. 4 illustrates testing an electromagnetic tool 400, according to various embodiments. In this case, lab testing was performed to validate the field observations reported previously. As shown in FIG. 4, a tool 400 equipped with a tilted transmitter and/or tilted receiver can be located at the center of a water tank 410 where the water resistivity is about 1 ohm·m. A steel well casing 420 can be suspended in air, and the receiver located in the bottom of the casing 420. The casing 420 can then be elevated to a series of different positions while electromagnetic measurements are taken.

Figure 5:
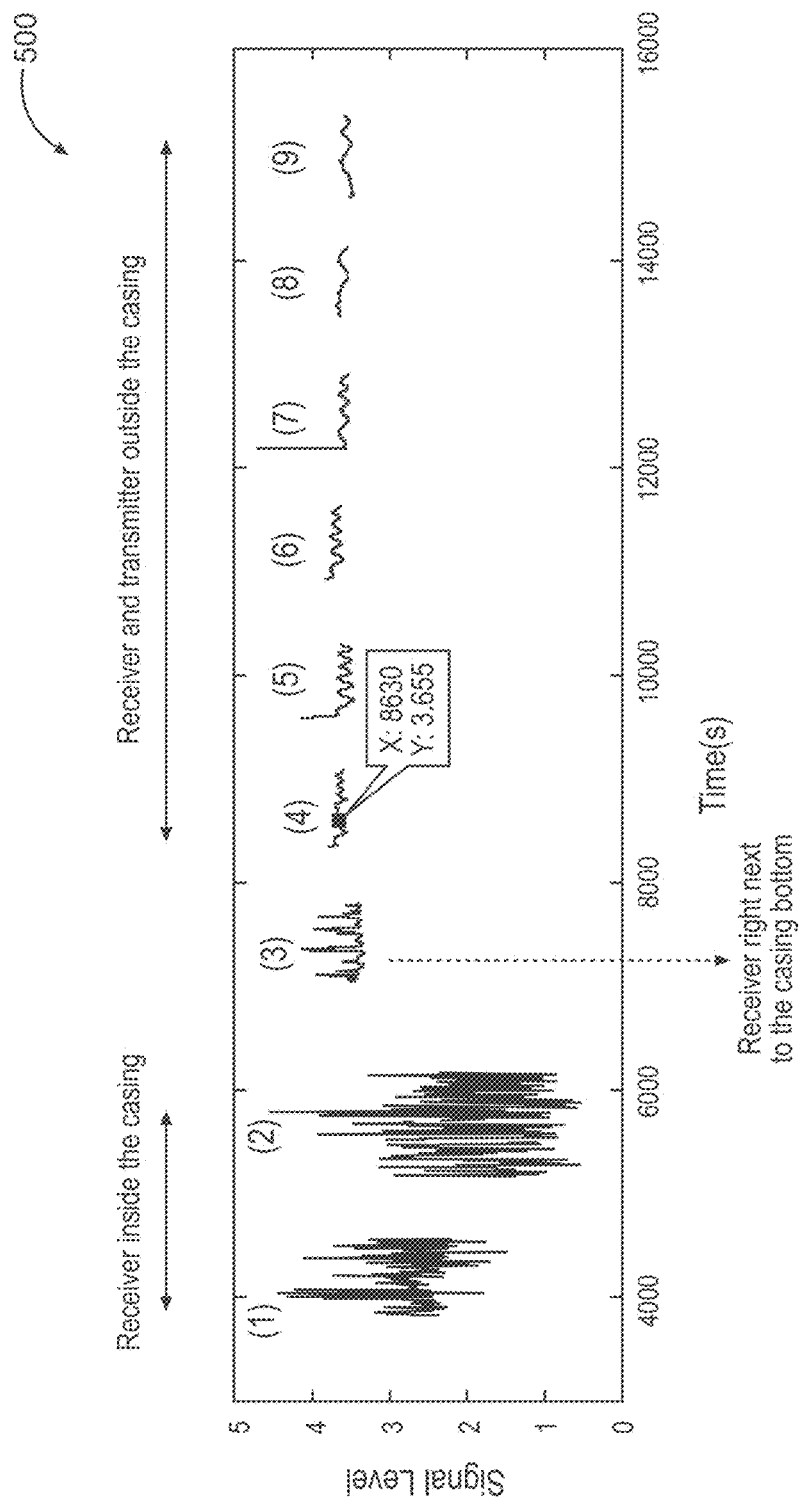
FIG. 5 is a graph of the measurement results obtained from the testing of FIG. 4, according to various embodiments.

FIG. 5 is a graph 500 of measurement results obtained from the testing of FIG. 4, according to various embodiments. Here the tool signal measurements corresponding to different measurement positions for the tool 400 in FIG. 4 are presented. For stations (1) and (2) in the graph 500, the receiver is inside the well casing, and the transmitter is outside the casing. For station (3), the receiver has just emerged from the bottom of the well casing. At stations (4) through (9), both the transmitter and receiver are outside of the well casing, such that only the water tank resistivity is being measured. As shown in the results presented by the graph 500, the tool electromagnetic signal clearly indicates the presence of the casing if one of the tool antennas is inside the casing (e.g., at stations (1), (2)).

Figure 6:
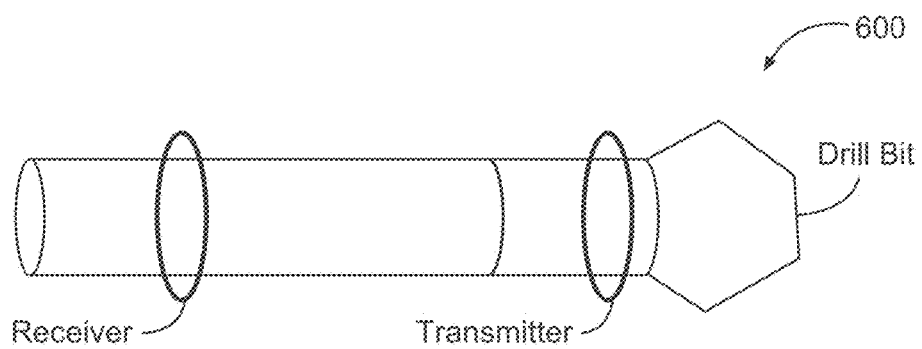
FIGS. 6 to 8 illustrate some antenna configurations that can be used for various range determination embodiments.
Figure 7:
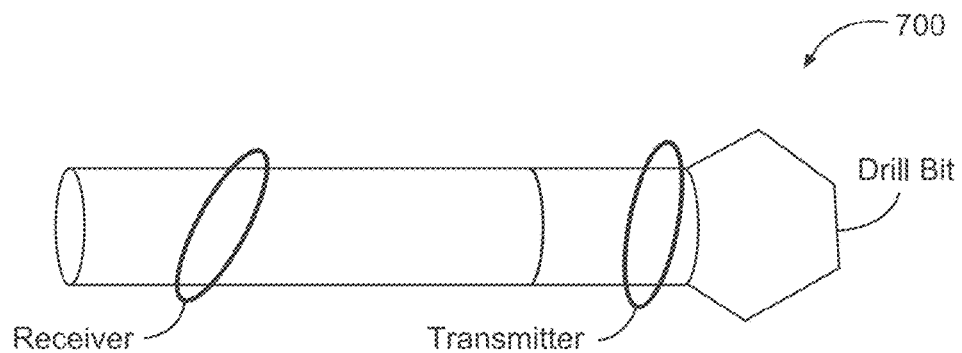
Figure 8:
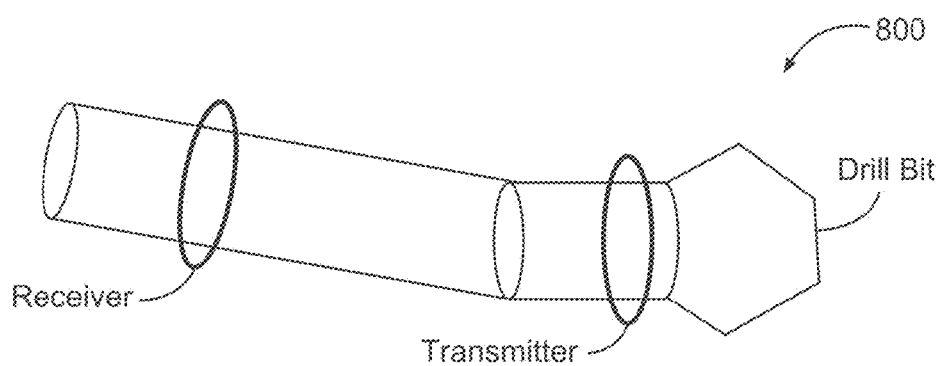

FIGS. 6 to 8 illustrate some antenna configurations 600, 700,800 that can be used for various range determination embodiments. Depending on conditions in the field, any one of these configurations 600, 700, 800 can be used to identify when interception has been successful. As shown in FIG. 6, a non-tilted transmitter can be installed next to the drilling bit, perhaps at the BHA, and a non-tilted receiver can be placed further away from the bit in another BHA location. Due to the non-tilted antenna design, the tool measurements should be accumulated and compared with each other. Then, once the responses indicate an abnormal peak (e.g., the areas 530, 540 illustrated in FIG. 3), successful interception of a cased well can be confirmed. That is, when the electromagnetic signal amplitude, or its average, increases by more than twice a series of previously measured signal amplitudes (e.g., ten or twenty prior electromagnetic measurements, or an average thereof), penetration may have occurred. Penetration is even more likely to have occurred, and can be confirmed, when the electromagnetic amplitude measurements stay at an elevated level for some time, and then drop back down to the levels experienced prior to the elevated levels.

On the other hand, if one of the antennas is tilted, as shown in FIG. 7, so that azimuthal measurements are enabled as the bit rotates, then the azimuthal measurements at a given depth can be used to identify the completion of the well interception. For example, as shown in the far-right track in FIG. 3 (track 4), the image of the tool azimuthal responses can indicate the abnormality that may be used to identify when the tool has penetrated the casing. Consequently, accumulated data may not be as useful for the embodiment shown in FIG. 7—when azimuthal measurements are available.

It is noted that the configuration 800 shown in FIG. 8 has similar capabilities to the configuration 700 shown in FIG. 7, even though both the transmitter and receiver antenna are non-tilted. This is because the different inclinations of different sections of the BHA permit non-tilted antennas to produce azimuthal measurements, because the relative angle between the antennas is not zero. In effect, one of the antennas is tilted with respect to the other. According to the principle of reciprocity, one antenna may be designated as a transmitter or receiver, with the other antenna being designated as a corresponding receiver or transmitter. As long as one of the antennas is tilted with respect to the other, the mechanisms denoted herein may be applied as if the antennas were installed in a tilted position with respect to one another.

Density or Other Logging Tools Used to Determine Well Interception

As noted previously, a density tool may provide abnormal signal readings when its sensors are located inside the casing. The imaging responses of a density tool can present high density data when sensors are inside the casing because the casing density is typically much higher than the formation density, or the density of other materials down hole. Therefore, tool density images can be utilized to determine successful completion of well interception—assuming the density sensors are located proximate to the drill bit.

For example, in some embodiments, a density tool can be used to differentiate among different casing materials. For example, it can be useful to monitor casing corrosion over the lifetime of a cased well. In some embodiments, a Pulsed-Neutron Tool (PNT) can be used to identify casing corrosion. When measurements made by a PNT are logged in a well, the presence of neutron-induced gamma rays are recorded. The energy associated with the gamma-ray measurements serve to distinguish different elements.

As an example, Table I lists some representative energy values for materials that are found in the crust of the Earth, after nuclear reactions have been induced by the presence of neutrons. It can be seen that the gamma-ray peak (Capture Gamma Energy) for Iron is quite a bit larger than the other elements.

TABLE I

| Elements | Inelastic Gamma Energy (MeV) | Capture Gamma Energy (MeV) |
| --- | --- | --- |
| H | N/A | 2.22 |
| C | 4.4 | N/A |
| O | 3.68, 6.1 | N/A |
| Si | 1.78 | 3.54 |

TABLE I-continued

| Elements | Inelastic Gamma Energy (MeV) | Capture Gamma Energy (MeV) |
| --- | --- | --- |
| Ca | 3.73 | 2.0, 6.42 |
| Fe | 0.9, 1.3 | 7.65 |

Figure 9:
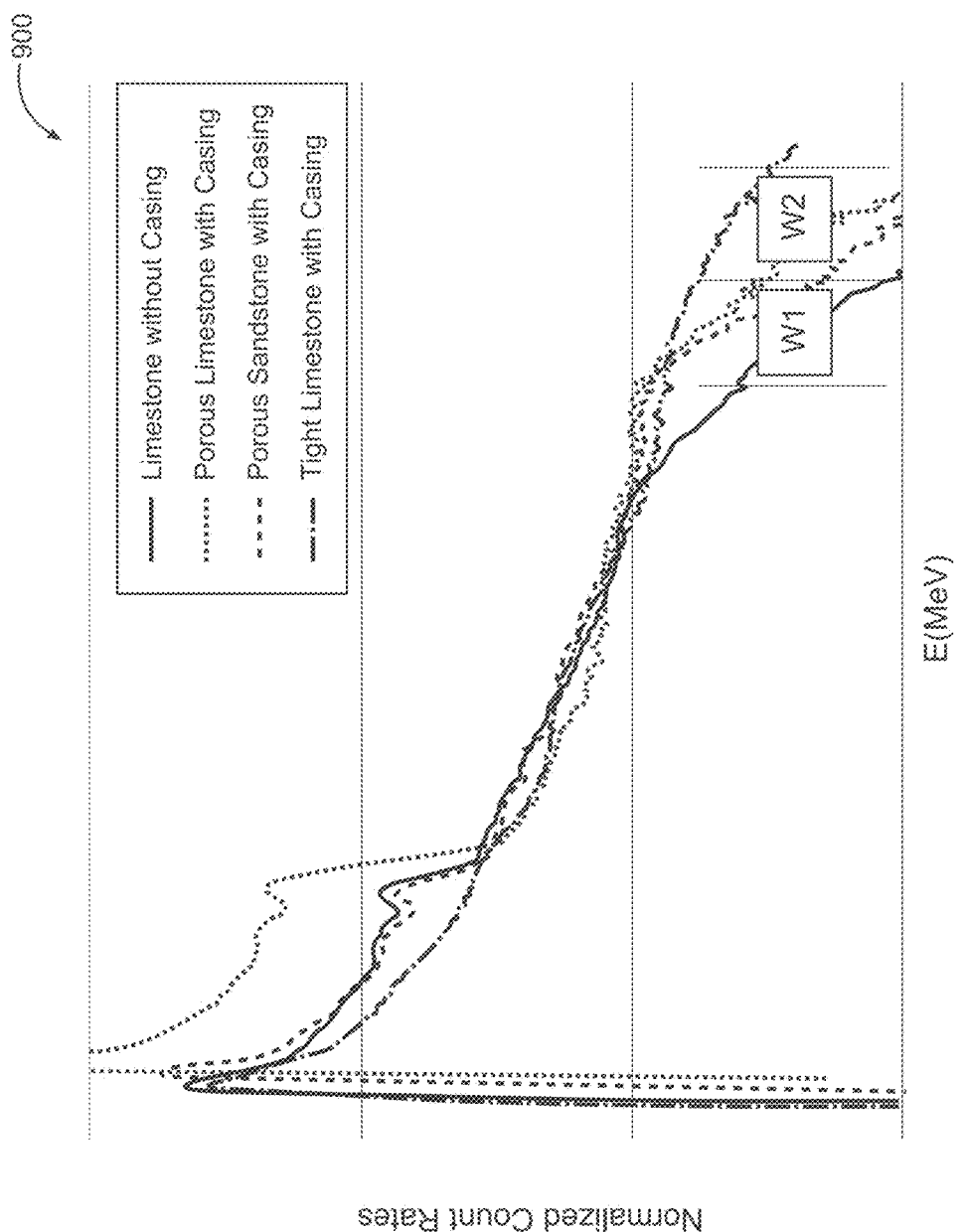
FIG. 9 is a graph of gamma ray spectra, according to various embodiments.

FIG. 9 is a graph 900 of gamma ray spectra, according to various embodiments. In this figure, the graph 900 shows gamma ray spectra that were recorded with a PNT in four test rock formations: limestone without casing (solid line), limestone of high porosity with casing (dotted line), limestone of low porosity with casing (dot-dash line), and sandstone of high porosity with casing (dashed line).

The normalized iron window count rates shown in window W2 are relatively stable when casing is present, among the three examples with casing: porous limestone, porous sandstone, and tight limestone. When casing is not present (e.g., for limestone without casing), the W2 count rates drop significantly.

There is an overlap for spectra in window W1, with and without casing, that permits normalizing W1 counts. Thus, the W2/W1 ratios were calculated in each case. The count ratios with the casing are about 0.6, and the ratio without casing is about 0.4. Therefore, when casing corrosion exists, the count ratio is expected to be in-between the values of 0.4 and 0.6.

Moreover, a corrosion index may be computed to indicate the extent of corrosion using a mathematical algorithm. Linear interpolation may be useful to provide a scale, where 0% corrosion corresponds to a ratio of 0.6, and 100% corrosion corresponds to a ratio of 0.4. In some embodiments, a ratio of greater than 0.6 indicates penetration of the casing by a bit located proximate to the density tool.

The use of a PNT presents some advantages over acoustic methods. First, the depth of investigation is greater, so that a PNT enables inspection of casings behind one or two smaller casing strings. Second, PNT measurements can cover the entire perimeter of the casing pipe, whereas an electric or acoustic method may be limited to the extent of the azimuthal survey. Finally, PNT measurements are less sensitive to cement bonding at the high energy portion of the spectrum. As a matter of contrast, poor bonding quality may cause noise in acoustic or electric measurements.

Additional Detailed Description and Some Representative Embodiments

Figure 10:
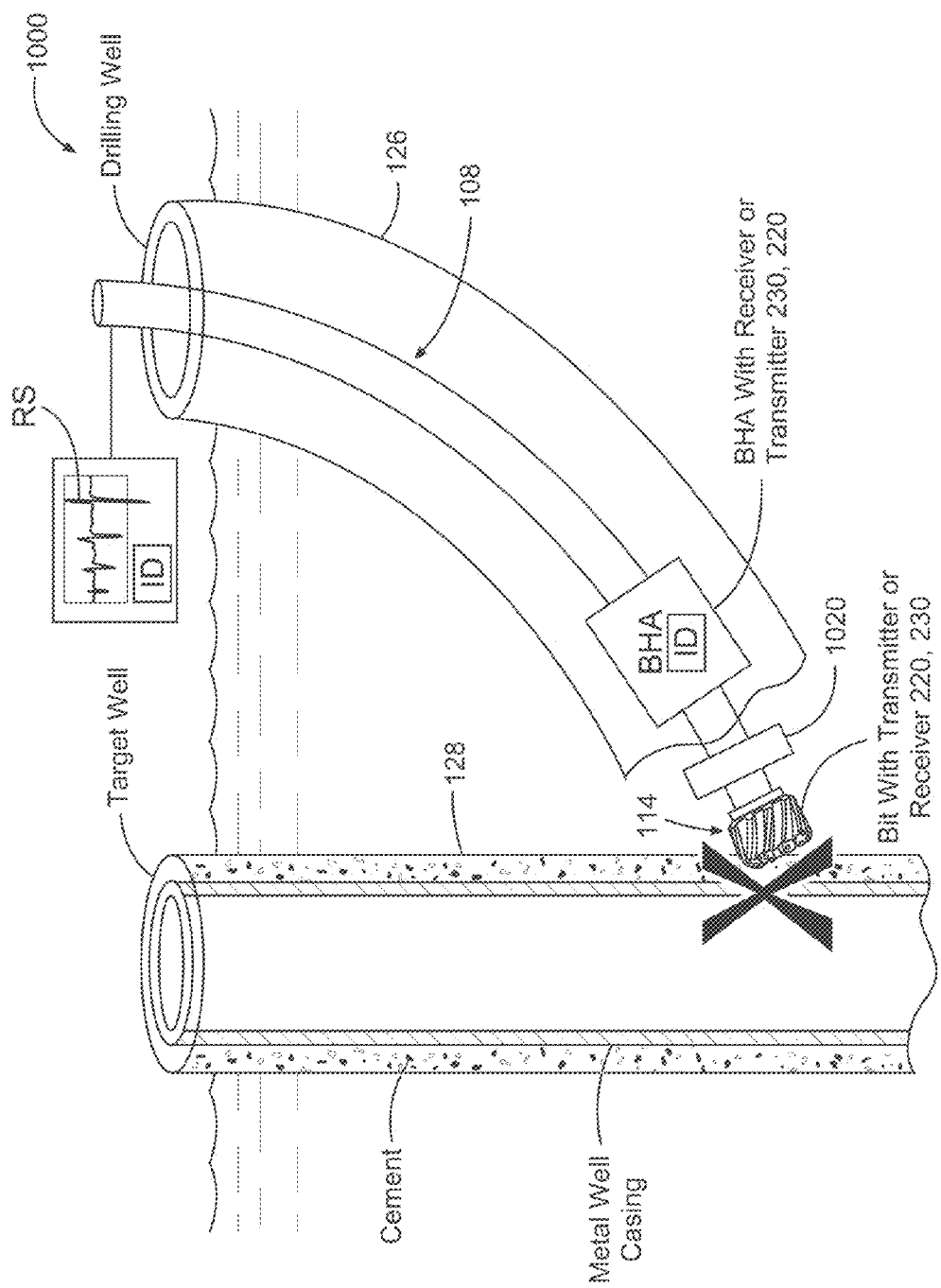
FIG. 10 is a block diagram of a well interception detection system, according to various embodiments.

FIG. 10 is a block diagram of a well interception detection system 1000, according to various embodiments. Here it can be seen that in some embodiments, a system 1000 comprises a transmitter, in this case a transmission antenna 220, and a reception antenna 230 mechanically coupled to a drill string 108, wherein the reception antenna 230 is to provide an electromagnetic signal RS and is tilted with respect to the transmission antenna 220. The system 1000 also comprises an interception determination module ID to monitor the electromagnetic signal RS provided by the reception antenna 230, and to determine interception of a well casing surrounding a second well (e.g., target well 128) by a first well (e.g., the drilling well 126), wherein the module ID is to receive the electromagnetic signal RS resulting from transmissions by the transmitter (e.g., the transmission antenna 220), and wherein the module ID is to determine the interception of the second well by examining values, such as binned values, associated with a magnitude of the electromagnetic signal RS obtained during rotation of the drill string 108 within the first well. In some embodiments, the values are obtained at multiple depths of the first well, as an alternative to, or in addition to, those values provided while rotation of the bit 114 occurs.

In some embodiments, a system 1000 comprises a density measurement tool 1020 mechanically coupled to a drill bit (e.g., attached to the drill string 108 within about 2 m of the drill bit 114). The system 1000 also comprises an interception determination module ID to determine interception of a well casing surrounding a second well (e.g., the target well) by a first well (e.g., the drilling well), wherein the module ID is to receive gamma ray spectra count values provided by the density measurement tool, and to determine the interception of the second well by examining a ratio of the gamma ray spectra count values obtained during rotation of the drill bit within the first well. Still further embodiments may be realized.

For example, referring now to FIGS. 1 and 10, in some embodiments, it can be seen that the transmitter comprises a current source (e.g., as shown in FIG. 1—where surface excitation is used, such that a current source, for instance the power supply 148, is coupled to the casing of either the first well or the second well; or when sub-surface excitation is used, such that the current source is included in a tool housing forming part of the drill string 108), the electromagnetic signals RS that result are received by the reception antenna 230 in the BHA. These RS signals can also be used to determine when the reception antenna 230 is outside the target well 128 (i.e., no interception has occurred) or inside the target well 128 (i.e., successful interception has occurred). In some embodiments, the reception antenna 230 comprises one or more magnetometers or coil antennas.

In some embodiments, the electromagnetic signal RS may comprise any one or more of a complex voltage, the magnitude of a complex voltage, a phase of the complex voltage, a complex magnetic field, the magnitude of the complex magnetic field, the phase of the complex magnetic field, etc. In some embodiments, the electromagnetic signal RS is used to determine the value of a resistivity measurement.

Thus, in some embodiments, a system 1000 includes a transmitter comprising a transmission antenna 220, or a current source (e.g., power supply 148) to couple to a well casing or a tool housing in a drill string 108; and a reception antenna 230 mechanically coupled to the drill string 108, wherein the transmitter is to provide an electromagnetic signal RS to the reception antenna. The system 1000 may further comprise an interception determination module ID to monitor the electromagnetic signal RS received by the reception antenna, and to determine interception of a casing surrounding a second well (e.g., well 128) by a first well (e.g., well 126), by examining values associated with a magnitude of the electromagnetic signal RS obtained during rotation of the drill string 108 within the first well, or obtained at multiple depths within the first well.

In some embodiments, the reception antenna 230 can be tilted with respect to the transmitter when the transmitter comprises a transmission antenna 220, or wherein the reception antenna 230 can be tilted with respect to a longitudinal axis of a portion of the drill string 108 (e.g., the BHA) when the transmitter comprises a current source coupled to the well casing or the tool housing.

In some embodiments, the transmitter comprises an electromagnetic transmission antenna 220 located at a bit 114 of the drill string 108, and the reception antenna 230 comprises a tilted electromagnetic receiver antenna in the tool housing (e.g., the BHA), mechanically coupled to the bit 114.

In some embodiments, the transmitter comprises a transmission antenna 220, and the transmission antenna 220 and the reception antenna 230 are tilted with respect to a longitudinal axis of the tool housing (e.g., some portion of the drill string 108), and with respect to each other.

In some embodiments, the drill string 108 is mechanically coupled to the tool housing comprising a bottom hole assembly (BHA), and the reception antenna 230 can be tilted with respect to the transmitter comprising a transmission antenna 220 due to an inclination of one section of the BHA with respect to another section of the BHA.

Figure 11:
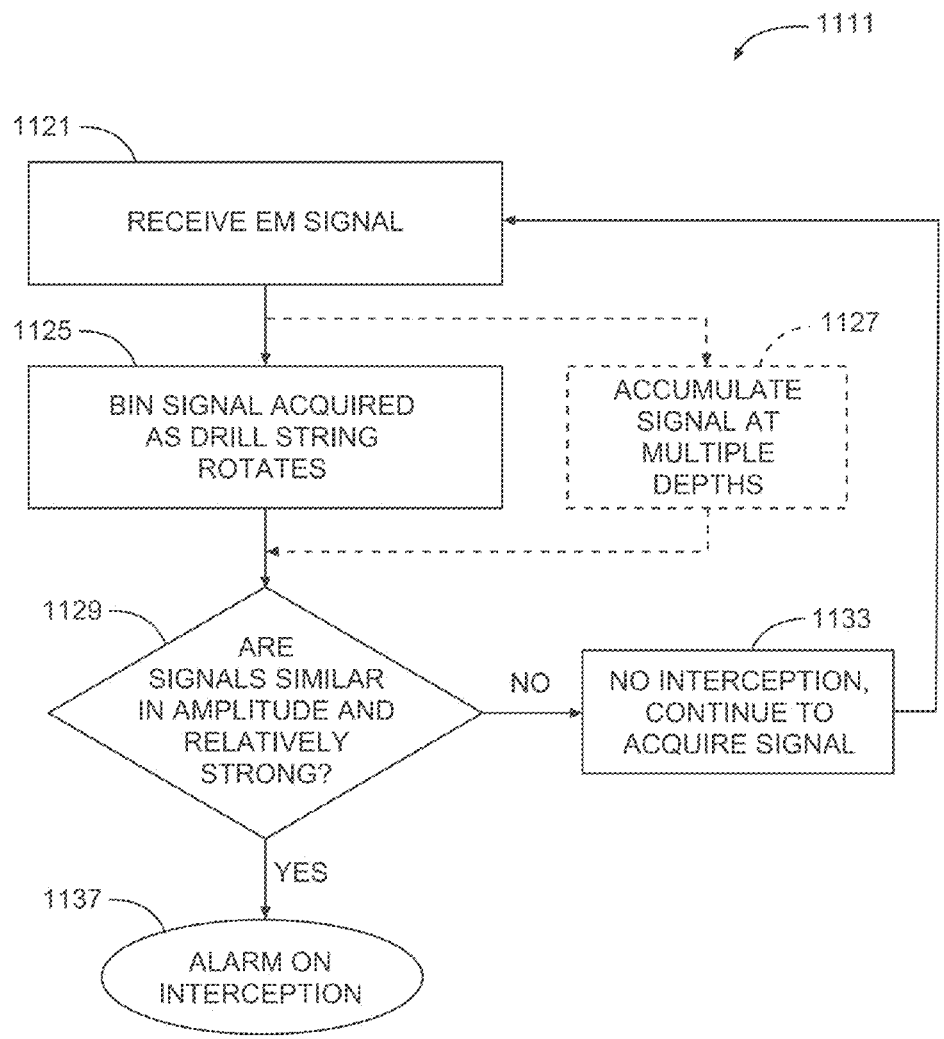
FIG. 11 is a flow diagram of a well interception detection method, according to various embodiments.

FIG. 11 is a flow diagram of a well interception detection method 1111, according to various embodiments. In some embodiments, the method 1111 of determining when interception of a target well by a drilling well has occurred, comprises receiving electromagnetic signals at a reception antenna attached to a drill string, wherein the electromagnetic signals originate at a transmission antenna attached to the drill string at block 1121.

In some embodiments, the method 1111 may comprise, as a combination of the activity at blocks 1125, 1129, and 1133, monitoring electromagnetic signals, using a reception antenna, to determine interception of a first well created by the drill string with a well casing surrounding a second well. In some embodiments, the reception antenna is tilted with respect to the transmission antenna, or to a tool housing, and in some embodiments, at least one of the reception antenna or the transmission antenna are rotating during the receiving. In some embodiments, the electromagnetic signals originate with a current source coupled to a well casing, or a current source installed in a down hole tool, as described previously.

In some embodiments, when a comparison is made at block 1129, the activity of the method 1111 may comprise determining that interception occurs when a magnitude of the values associated with the electromagnetic signal becomes relatively strong (e.g., is more than twice the magnitude of a prior series of values, or an average of values associated with the electromagnetic signal) and/or significantly irregular responses compared to previously-acquired data.

In some embodiments, monitoring to determine relative signal strength (and interception) comprises binning values associated with a magnitude of the electromagnetic signal to distribute the values in bins as distributed signals according to an azimuthal location of reception within the first well. In some embodiments, a determination that interception has occurred as a penetration of the well casing by the first well is made when the magnitude of the distributed signals becomes substantially equal across the bins. In some embodiments, the magnitude of the distributed signals becomes substantially similar across the bins, as determined at block 1129, when the magnitude of any one of the distributed signals is within a selected range of an average value of all magnitudes of the distributed signals. In some embodiments, the selected range comprises one of 10%, or 20%, or 25%, or 30%, or 40%, or 50% of an average value of all magnitudes of the distributed signals.

In addition, in some embodiments, the electromagnetic signals are received as an accumulation of data over multiple depths. In this case, binning may not be used at all. For example, the tool may be operated in a sliding mode when rotation is not available. Then the acquired signal data is obtained at a single azimuthal angle, regardless of whether any of the antennas involved in transmission or reception are tilted. Thus, additional embodiments may be realized.

For example, in some embodiments, a method 1111 comprises receiving an electromagnetic signal at a reception antenna attached to a drill string at block 1121, wherein the electromagnetic signal originates at a transmitter attached to the drill string, or electrically coupled to the drill string or a well casing; and monitoring the electromagnetic signal to determine interception of a first well created by the drill string at block 1129 with a well casing surrounding a second well, by examining values associated with a magnitude of the electromagnetic signal obtained during rotation of the drill string within the first well (e.g., at block 1125), or obtained at multiple depths within the first well (e.g., at block 1127).

In some embodiments, when no interception is determined, signal acquisition may continue, as noted at block 1133. In some embodiments, when interception is determined, an alarm is indicated, at block 1137.

Figure 12:
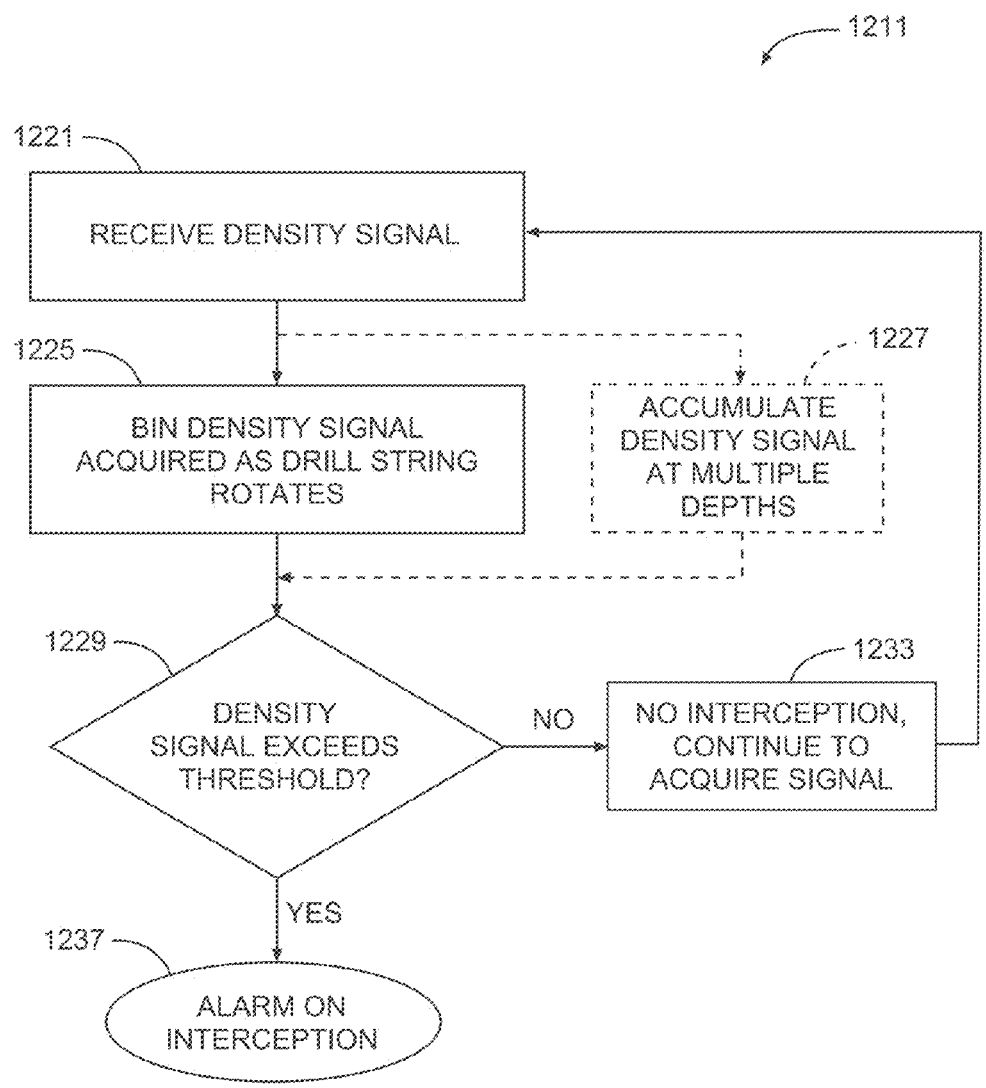
FIG. 12 is a flow diagram of a well interception detection method, according to various embodiments.

FIG. 12 is a flow diagram of a well interception detection method 1211, according to various embodiments. In some embodiments, the method 1211 of determining when interception of a target well by a drilling well has occurred, comprises receiving gamma ray spectra count values from a density tool attached to a drill string as part of receiving a density signal at block 1221.

In some embodiments, the method 1211 may comprise, as a combination of the activity at blocks 1225, 1229, and 1233, monitoring the gamma ray spectra count values to determine interception of a first well created by the drill string with a well casing surrounding a second well, by determining when a ratio of the gamma ray spectra count values have exceeded a first predetermined threshold (e.g., about 0.6), or when a capture gamma energy indicated by the gamma ray spectra count values exceeds a second predetermined threshold (e.g., about 7, or the nominal value for Iron). In some embodiments, the ratio of gamma ray spectra count values comprises a ratio of previously acquired ones of the gamma ray spectra count values to current ones of the gamma ray spectra count values.

In some embodiments, the density signal is binned as the drill string rotates, as indicated at block 1225. In some embodiments, the occurrence of an interception is determined by comparing the acquired density signals against a threshold, as indicated at block 1229.

Again, binning is not used in some embodiments. Thus, density signal data may also be obtained for reference, as reference data that has been accumulated at prior depths (at block 1227). Then, at block 1229, newly-acquired density data can be compared to the reference data to determine whether interception has occurred. As is the case with reference electromagnetic signal data that is acquired at multiple depths, this comparison can be accomplished in the same way comparison is made against binned data—using individual values, or averages of individual values, etc.

In some embodiments, when no interception is determined, signal acquisition may continue, as noted at block 1233. In some embodiments, when interception is determined, an alarm is indicated, at block 1237.

Figure 13:
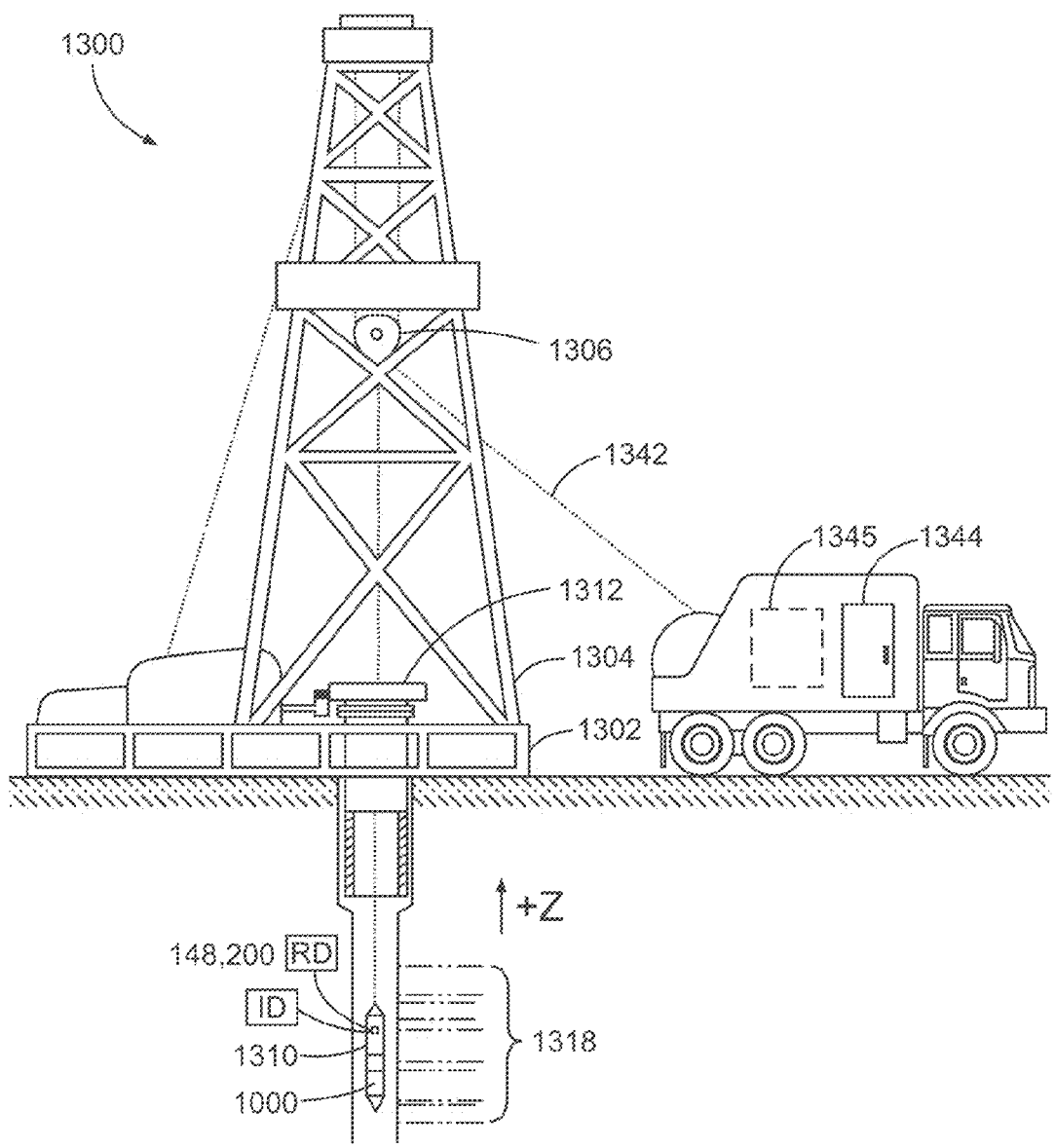
FIG. 13 is a block diagram of a wireline system implementation, according to various embodiments.

FIG. 13 is a block diagram of a wireline system 1300 implementation of various embodiments. The system 1300 of FIG. 13 may include any of the embodiments of receiver or sensor mounting discussed previously. In this case, a hoist 1306 may be included as a portion of a platform 1302, such as might be coupled to a derrick 1304, and used to raise or lower equipment such as a wireline sonde 1310 into or out of a borehole. The wireline sonde 1310 may include any one or more of the above-described embodiments, including sensors (e.g., shown as part of the system 1000) and a range determination module RD, and/or interception determination module ID.

In this wireline example, a cable 1342 may provide a communicative coupling between a logging facility 1344 (e.g., including a processor circuit 1345 including memory or other storage or control circuitry) and the sonde 1310. In this manner, information about the formation 1318 may be obtained. The processor circuit 1345 can be configured to access and execute instructions stored in a memory to implement any of the methods described herein (e.g., by accessing a range determination module RD or interception determination module ID). For example, after drilling a borehole, a sonde 1310 may be lowered into the borehole to indicate casing penetration according to the methods described previously.

Figure 14:
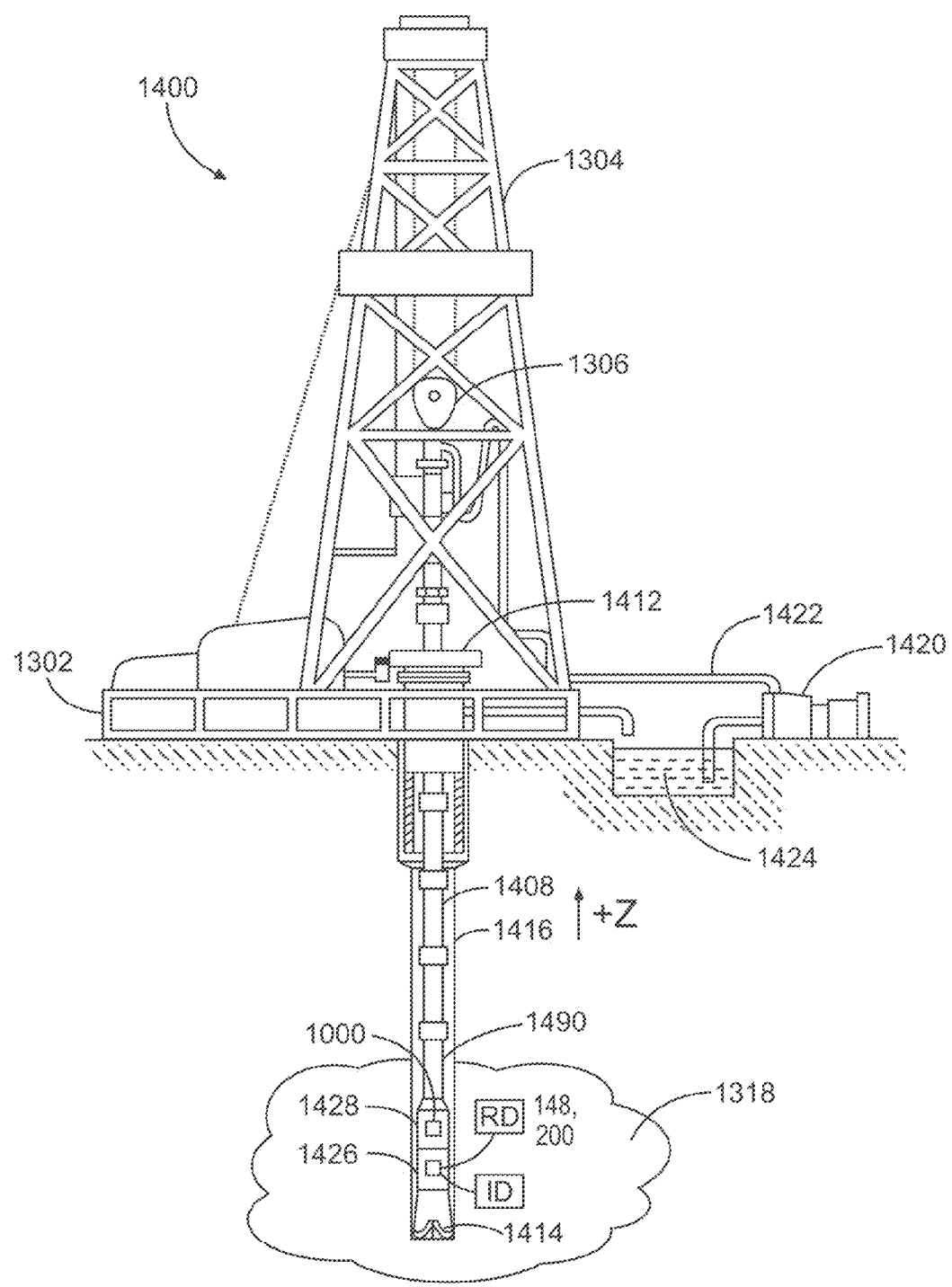
FIG. 14 is a block diagram of a drilling system implementation, according to various embodiments.

FIG. 14 is a block diagram of a drilling system 1400 implementation of various embodiments. This diagram shows a drilling rig system 1400 according to various embodiments that may include measurement while drilling (MWD) or logging while drilling (LWD) capability. The drilling apparatus can use data from an insert in the drill string 1408, having attached to a number of receivers or sensors (e.g., shown as apparatus 200 and 910) as discussed previously, and using acquired and calculated ranging information to steer the drill bit 1414.

A drilling rig or platform 1302 generally includes a derrick 1304 or other supporting structure, such as including or coupled to a hoist 1306. The hoist 1306 may be used for raising or lowering equipment or other apparatus such as drill string 1408. The drill string 1408 may access a borehole 1416, such as through a well head 1312. The lower end of the drill string 1408 may include various apparatus, such as a drill bit 1414, such as to provide the borehole 1416.

A drilling fluid or "mud" may be circulated in the annular region around the drill bit 1414 or elsewhere, such as provided to the borehole 1416 through a supply pipe 1422, circulated by a pump 1420, and returning to the surface to be captured in a retention pit 1424 or sump. Various subs or tool assemblies may be located along the drill string 1408, such as a bottom hole assembly (BHA) 1426 or a second sub 1428. The BHA 1426 and/or the sub 1428 may include one or more sensors or receivers (e.g., shown as parts of the apparatus 200 and/or system 1000), as well as a ranging determination module RD, or an interception determination module ID, as described herein, along with a current source (e.g., a power supply 148) to initiate a ranging signal, and a processor with access to a memory that contains a program to implement any of the methods described herein.

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1, or some other form of a data processing device 140, to implement portions of a method of the present disclosure, for example the processes and methods described in FIGS. 11-12 (e.g., for computer-assisted well completion).

Though sometimes described serially in the examples of FIG. 11-12, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system ranging accuracy, including the determination of well interception, can be improved with the various embodiments described herein. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized.

Similarly, while some of the above-described embodiments may show only one receiver, perhaps in the form of a magnetometer, coil, or telemetry receiver, one of ordinary skill in the art would realize that a drill string or downhole tool may include multiple receivers for making the various measurements described herein. Examples of various embodiments will now be listed in a non-limiting fashion.

In some embodiments, a method comprises receiving an electromagnetic signal at a reception antenna attached to a drill string, wherein the electromagnetic signal originates at a transmitter attached to the drill string, or electrically coupled to the drill string or a well casing; and monitoring the electromagnetic signal to determine interception of a first well created by the drill string with a well casing surrounding a second well, by examining values associated with a magnitude of the electromagnetic signal obtained during rotation of the drill string within the first well, or obtained at multiple depths within the first well.

In some embodiments, interception is determined to occur when the magnitude of the values associated with the electromagnetic signal is more than twice the magnitude of a prior series of values associated with the electromagnetic signal.

In some embodiments, the monitoring further comprises binning the values associated with a magnitude of the electromagnetic signal to distribute the values in bins as distributed signals according to an azimuthal location of reception within the first well.

In some embodiments, interception is determined to have occurred as a penetration of the well casing by the first well when a magnitude of the distributed signals becomes substantially equal across the bins.

In some embodiments, the magnitude of the distributed signals becomes substantially similar across the bins when a magnitude of any one of the distributed signals is within a selected range of an average value of all magnitudes of the distributed signals.

In some embodiments, the selected range comprises one of 10%, or 20%, or 25%, or 30%, or 40%, or 50% of an average value of all magnitudes of the distributed signals.

In some embodiments, a method of determining when interception of a target well by a drilling well has occurred comprises receiving gamma ray spectra count values from a density tool attached to a drill string. In some embodiments, the method comprises monitoring the gamma ray spectra count values to determine interception of a first well created by the drill string with a well casing surrounding a second well, by determining when a ratio of the gamma ray spectra count values have exceeded a first predetermined threshold, or when a capture gamma energy indicated by the gamma ray spectra count values exceeds a second predetermined threshold.

In some embodiments, the ratio of gamma ray spectra count values comprises a ratio of previously acquired ones of the gamma ray spectra count values to current ones of the gamma ray spectra count values.

In some embodiments, determining when the ratio of the gamma ray spectra count values have exceeded the first predetermined threshold comprises determining when the ratio of the gamma ray spectra count values have exceeded a value of about 0.6.

In some embodiments, determining the capture gamma energy indicated by the gamma ray spectra count values exceeds the second predetermined threshold comprises determining when the capture gamma energy indicated by the gamma ray spectra count values exceeds a preselected nominal value for Iron.

In some embodiments, the method comprises computing a corrosion index to indicate an extent of corrosion in the well casing. In some embodiments, the index is included in a scale in which 0% corrosion corresponds to the ratio having a value of about 0.6, and 100% corrosion corresponds to the ratio having a value of about 0.4.

In some embodiments, as shown in FIGS. 1-2, 4, 6-8, 10, and 13-14, a system includes a transmitter comprising a transmission antenna or a current source to couple to a well casing or a tool housing in a drill string; and a reception antenna mechanically coupled to the drill string. The transmitter is to provide an electromagnetic signal to the reception antenna. In some embodiments, the system further comprises an interception determination module to monitor the electromagnetic signal received by the reception antenna, and to determine interception of a casing surrounding a second well by a first well, by examining values associated with a magnitude of the electromagnetic signal obtained during rotation of the drill string within the first well, or obtained at multiple depths within the first well.

In some embodiments, the reception antenna can be tilted with respect to the transmitter when the transmitter comprises a transmission antenna, or the reception antenna can be tilted with respect to a longitudinal axis of a portion of the drill string (e.g., the BHA) when the transmitter comprises a current source coupled to the well casing or the tool housing.

In some embodiments, the transmitter comprises an electromagnetic transmitter located at a bit of the drill string, and the reception antenna comprises a tilted electromagnetic receiver antenna in the tool housing (e.g., the BHA), mechanically coupled to the bit.

In some embodiments, the transmitter comprises a transmission antenna, and the transmission antenna and the reception antenna are tilted with respect to a longitudinal axis of the tool housing, and with respect to each other.

In some embodiments, the drill string is mechanically coupled to the tool housing comprising a bottom hole assembly (BHA), and the reception antenna can be tilted with respect to the transmitter comprising a transmission antenna due to an inclination of one section of the BHA with respect to another section of the BHA.

In some embodiments, a system comprises a density measurement tool mechanically coupled to a drill bit. The system may also comprise an interception determination module to determine interception of a well casing surrounding a second well, by a first well, wherein the module is to receive gamma ray spectra count values provided by the density measurement tool, and to determine the interception by examining a tool density image based on the spectra count values obtained during rotation of the drill bit within the first well.

In some embodiments, examining the tool density image based on the spectra count values comprises examining a ratio of the gamma ray spectra count values. In some embodiments, the density measurement tool comprises a Pulsed-Neutron Tool (PNT).

In some embodiments, an apparatus comprises a down hole tool housing (e.g., ranging tool 124, realized as either an electromagnetic tool and/or a density tool) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 13). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system, comprising:
   a transmitter comprising a transmission antenna or a current source to couple to a well casing or a tool housing in a drill string, and a reception antenna mechanically coupled to the drill string, wherein the transmitter is to provide an electromagnetic signal to the reception antenna; and
   an interception determination module to monitor the electromagnetic signal received by the reception antenna, and to determine interception of a casing surrounding a second well by a first well, by examining values associated with a magnitude of the electromagnetic signal obtained during rotation of the drill string within the first well, and obtained at multiple depths within the first well; wherein examining the values comprises comparing the magnitude of the electromagnetic signal at different azimuthal locations of reception and at different depths to a respective selected range of an average of the magnitudes of the electromagnetic signals at the different azimuthal locations of reception and at the different depths; and determining the interception when at least one magnitude of the electromagnetic signal at the different azimuthal locations of reception or at the different depths is within the respective selected range, based on the comparison.

2. The system of claim 1, wherein the reception antenna can be tilted with respect to the transmitter when the transmitter comprises a transmission antenna, or wherein the reception antenna can be tilted with respect to a longitudinal axis of a portion of the drill string when the transmitter comprises a current source coupled to the well casing or the tool housing.

3. The system of claim 1, wherein the transmitter comprises an electromagnetic transmitter located at a bit of the drill string, and wherein the reception antenna comprises a tilted electromagnetic receiver antenna in the tool housing, mechanically coupled to the bit.

4. The system of claim 1, wherein the transmitter comprises a transmission antenna, and the transmission antenna and the reception antenna are tilted with respect to a longitudinal axis of the tool housing, and with respect to each other.

5. The system of claim 1, wherein the drill string is mechanically coupled to the tool housing comprising a bottom hole assembly (BHA), and wherein the reception antenna can be tilted with respect to the transmitter comprising a transmission antenna due to an inclination of one section of the BHA with respect to another section of the BHA.

6. The system of claim 1, wherein examining the values further comprises binning the magnitude of the electromagnetic signal to distribute the values in bins as distributed signals according to the azimuthal location of reception within the first well, comparing the values in the bins, and determining the interception has occurred as a penetration of the well casing by the first well based on the comparison.

7. The system of claim 1, wherein determining the interception comprises determining when at least one magnitude of the electromagnetic signal at the different azimuthal locations of reception or at the different depths transitions from within the respective selected range to not within the respective selected range.

8. A method, comprising:
receiving an electromagnetic signal at a reception antenna attached to a drill string, wherein the electromagnetic signal originates at a transmitter attached to the drill string, or electrically coupled to the drill string or a well casing; and
monitoring, by a processor, the electromagnetic signal to determine interception of a first well created by the drill string with a well casing surrounding a second well, by examining values associated with a magnitude of the electromagnetic signal obtained during rotation of the drill string within the first well and obtained at different depths within the first well; wherein examining the values comprises comparing the magnitude of the electromagnetic signal at different azimuthal locations of reception and at the different depths to a respective selected range of an average of the magnitudes of the electromagnetic signals at the different azimuthal locations of reception and at the different depths; and
determining, by the processor, the interception when at least one magnitude of the electromagnetic signal at the different azimuthal locations of reception or at the different depths is within the respective selected range based on the comparison.

9. The method of claim 8, wherein the interception is determined to occur when the magnitude of the values associated with the electromagnetic signal transitions from more than twice the magnitude of a prior series of values associated with the electromagnetic signal to not more than twice the magnitude of the prior series of values associated with the electromagnetic signal.

10. The method of claim 8, wherein the monitoring further comprises:
binning the values associated with a magnitude of the electromagnetic signal obtained during rotation of the drill string within the first well to distribute the values in bins as distributed signals according to an azimuthal location of reception within the first well.

11. The method of claim 8, wherein examining the values further comprises binning the magnitude of the electromagnetic signal to distribute the values in bins as distributed signals according to an azimuthal location of reception within the first well, comparing the values in the bins, and determining the interception has occurred as a penetration of the well casing by the first well based on the comparison.

12. The method of claim 8, wherein determining the interception comprises determining when at least one magnitude of the electromagnetic signal at the different azimuthal locations of reception or at the different depths transitions from within the respective selected range to not within the respective selected range.

13. A method, comprising:
receiving an electromagnetic signal at a reception antenna attached to a drill string, wherein the electromagnetic signal originates at a transmitter attached to the drill string, or electrically coupled to the drill string or a well casing; and
monitoring, by a processor, the electromagnetic signal to determine interception of a first well created by the drill string with a well casing surrounding a second well, by examining values associated with a magnitude of the electromagnetic signal obtained during rotation of the drill string within the first well;
wherein the monitoring further comprises:
binning, by the processor, the values associated with a magnitude of the electromagnetic signal to distribute the values in bins as distributed signals according to an azimuthal location of reception within the first well and
determining, by the processor, interception has occurred as a penetration of the well casing by the first well when a magnitude of the distributed signals becomes substantially equal across the bins.

14. The method of claim 13, wherein the magnitude of the distributed signals becomes substantially similar across the bins when a magnitude of any one of the distributed signals is within a selected range of an average value of all magnitudes of the distributed signals.

15. The method of claim 14, wherein the selected range comprises one of 10%, or 20%, or 25%, or 30%, or 40%, or 50% of an average value of all magnitudes of the distributed signals.

* * * * *